United States Patent [19]

Houseman

[11] 4,439,300
[45] Mar. 27, 1984

[54] VORTEX TYPE METAL COLLECTOR

[75] Inventor: Kenneth R. Houseman, Westlake, Ohio

[73] Assignee: General Dental, Inc., St. Louis, Mo.

[21] Appl. No.: 481,469

[22] Filed: Apr. 1, 1983

[51] Int. Cl.³ .......................... C25C 7/00; C25C 1/20
[52] U.S. Cl. .................................. 204/272; 204/273; 204/275; 204/109
[58] Field of Search ............................... 204/271-273, 204/109, 275-278

[56] References Cited

U.S. PATENT DOCUMENTS

| | | | |
|---|---|---|---|
| 3,560,366 | 2/1971 | Fisher | 204/271 X |
| 4,280,884 | 7/1981 | Babb et al. | 204/272 X |
| 4,372,829 | 2/1983 | Cox | 204/272 X |

Primary Examiner—Donald R. Valentine
Attorney, Agent, or Firm—Pearne, Gordon, Sessions, McCoy, Granger & Tilberry

[57] ABSTRACT

A device for collecting ionized metal from a liquid solution, such as silver from photographic or radiographic solutions, which is highly efficient in operation and convenient in use. Efficiency of the device results from a unique flow path which induces vortex currents that promote increased electrolytic action. A cathode on which metal ions are deposited is formed of a configuration and composition that is sufficiently inexpensive to be considered disposable. Disassembly and reassembly of the device is accomplished with a minimum of effort and manipulative steps.

8 Claims, 4 Drawing Figures

U.S. Patent  Mar. 27, 1984  Sheet 1 of 2  4,439,300
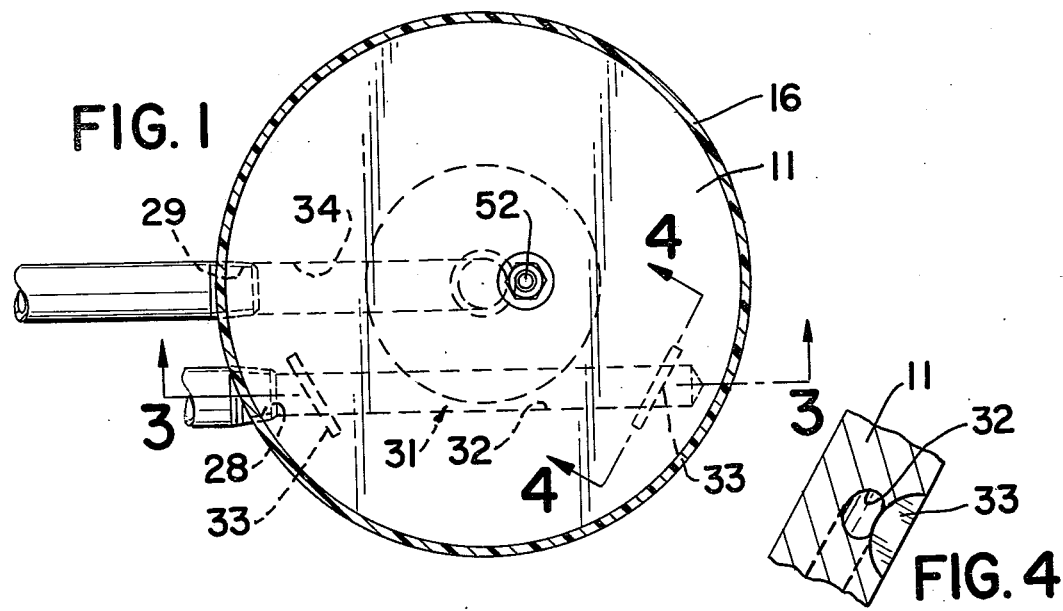
FIG. 1
FIG. 4
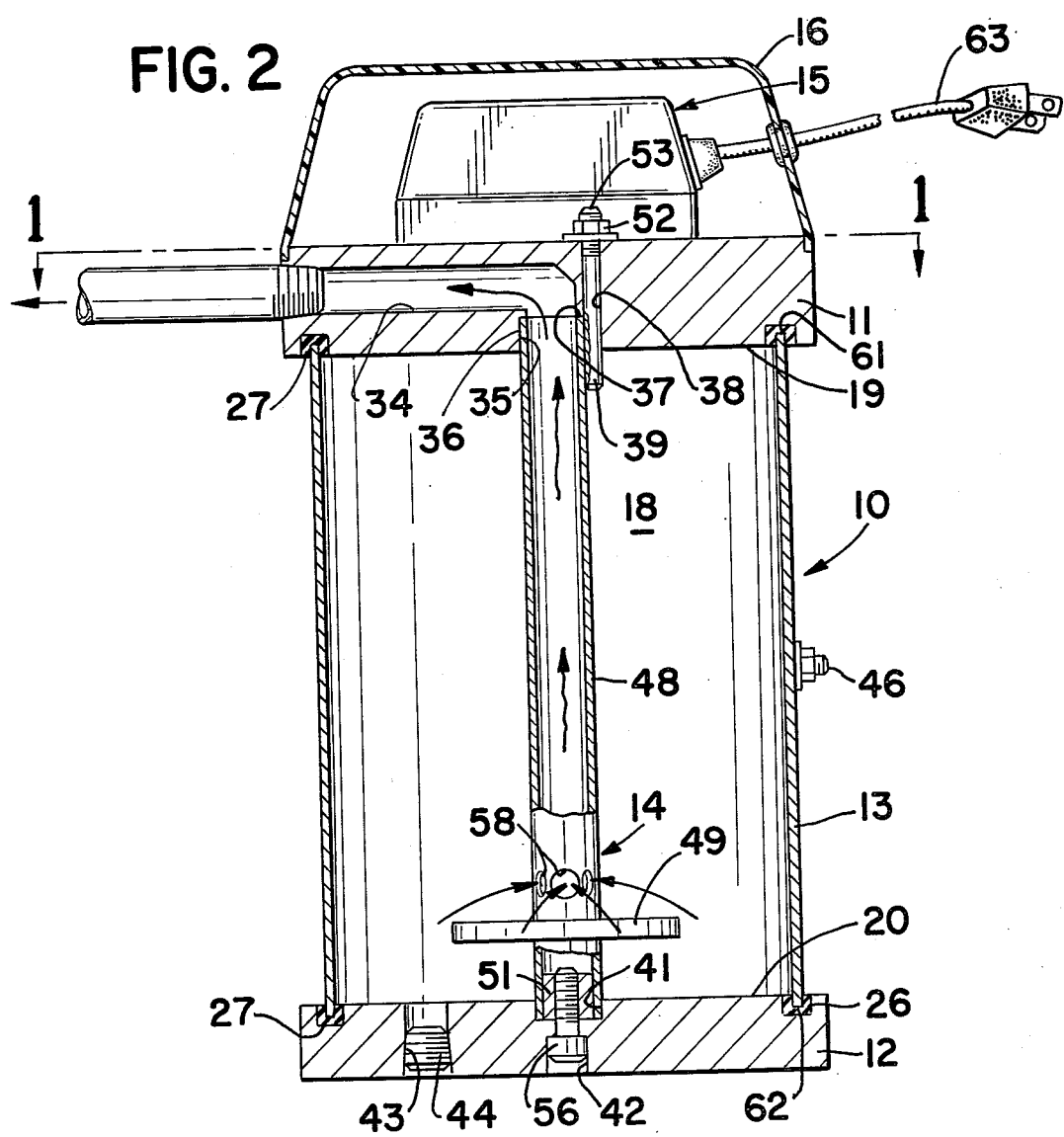
FIG. 2

VORTEX TYPE METAL COLLECTOR

BACKGROUND OF THE INVENTION

The invention relates to electrolytic separation of metals from solutions, and in particular relates to improvements in apparatus for performing such separation.

PRIOR ART

Electrolytic recovery of silver from photographic or radiographic film processing solutions and other metal ionized elements from different solutions such as plating solutions is known. A generally known class of device for recovering silver from processing solutions employs a cylindrical chamber through which processing fluid is conducted for electrolytic treatment. A cathode formed by or disposed adjacent to and essentially coextensive with the cylindrical wall of the chamber receives silver from the processing solution by electrolytic action. An anode is disposed at or adjacent the axis of the cylinder. Processing solution is circulated through the chamber while electric current is established between the electrodes through the solution.

In prior art devices, circumferential currents of solution typically are induced by stationary nozzles such as shown in U.S. Pat. Nos. 4,028,212 to Bowen, et al. and 4,149,954 to Ransbottem, for example, or rotating impellers such as shown in U.S. Pat. No. 3,694,341 to Luck, Jr. In the mentioned U.S. Pat. No. 4,028,212, a cathode is formed of flexible stainless steel sheet stock rolled into cylinder; the mentioned U.S. Pat. No. 3,694,341 discloses a cylindrical cathode made of stainless steel clamped between end plates to form a cylindrical chamber.

SUMMARY OF THE INVENTION

The invention provides a simplified construction for the described class of metal collectors that affords economies in its manufacture as well as convenience to the user. The device includes a unitary end cap that provides an inlet manifold for incoming fluid that feeds tangentially oriented nozzle means which discharge into the interior of the collection chamber. The end cap or plate, additionally, provides a mounting platform for an electrical power supply. A highly efficient flow pattern of liquid through the collection chamber which, ideally, is cylindrical is established by a relationship of the inlet nozzle means at one end of the chamber and a central outlet means adjacent the opposite end of the chamber. Associated with the outlet means is a transverse disc-like baffle which is believed to promote the flow activity of the solution passing through the collection chamber and therefore increase efficiency of the device.

In accordance with an important aspect of the invention, the device includes a central tubular electrode which serves several functions. As its primary function the central electrode serves as an anode for electrolytic action. At the same time, the central electrode forms outlet passage means in the collection chamber. Still further, the central electrode serves to retain opposed end caps or plates in liquid-tight engagement with associated ends of a cylindrical shell forming the collection chamber.

The disclosed metal collection device affords a high degree of convenience to the user. The device is readily disassembled for harvesting the collected metal. Such disassembly can, for example, be accomplished by removing a single threaded fastener associated with the central electrode. As disclosed, the cathode can be made in the form of a relatively low cost shell of stainless steel or other suitable electrically conducting material. Where, as disclosed, the cathode is disposable there is no need for the user to clean the collected material from it for reclamation of such material.

BRIEF DESCRIPTION OF THE DRAWINGS

FIG. 1 is a sectional view of a vortex type metal collector device constructed in accordance with the principles of the invention, taken at the transverse plane indicated by the line 1–1 in FIG. 2.

FIG. 2 is a cross-sectional view of the device taken in a longitudinal plane.

FIG. 4 is a fragmentary cross-sectional view, taken across the plane indicated by the line 4–4 in FIG. 1, illustrating details of an intake manifold and associated nozzle.

DESCRIPTION OF THE PREFERRED EMBODIMENT

Figure 3:
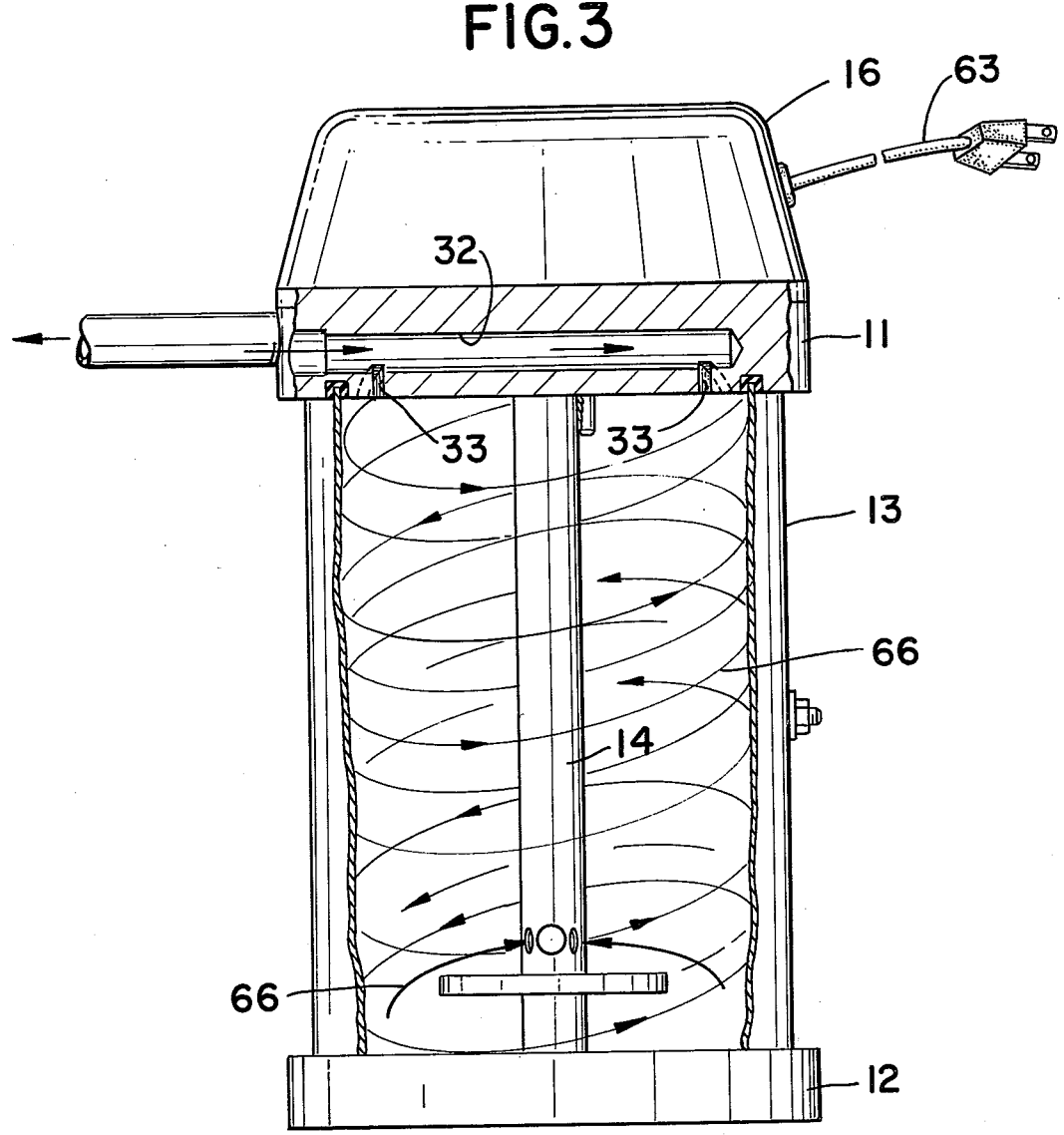
FIG. 3 is an elevational view, partially in section, of the device diagramatically illustrating the flow path of circulating fluid from which metal is recovered.

There is shown in the drawings a device 10 for collecting metal ions carried in a liquid. The device is used, for example, to recover silver ions in previously used photographic solution. The device 10 includes several housing elements arranged, in assembly, in a generally cylindrical configuration. These housing elements include circular end plates or caps 11, 12 at opposite ends of a cylindrical shell 13. A tube 14 concentric with the axis of the shell 13 extends between the end plates 11 and 12. A power supply 15 is mounted on one of the end plates 11 and is enclosed by a cup shaped cover 16.

The plate 11 is shown and hereinafter referred to as the upper plate. It will be understood that such terminology is used for convenience and that the device 10 may take other configurations and/or limitations.

Each of the end plates 11 and 12 are preferably formed of rigid plastic material, chemically resistant to the liquid being circulated in a cylindrical chamber 18 defined by the interior of the shell 13 and interior surfaces 19 and 20 of the respective end plates 11 and 12. A suitable material for the end plates is polyvinylchloride. The cylindrical chamber 18 is made liquid-tight at the juncture of the ends of the shell 13 and plates 11 and 12 by circular gaskets 26. These gaskets 26 are disposed in grooves 27 formed in the inner end plates surfaces 19, 20.

The upper end plate 11 is provided with a port 28 for receiving a supply of liquid to be processed and a port 29 for discharging processed liquid. The inlet port 28 communicates with an inlet manifold 31 formed by a cylindrical bore 32 and a pair of slots 33. The inlet bore 32 is a straight elongated blind cylindrical passage lying in a plane parallel to the inner face 19 of the plate 11 and extending along a line that forms a cord with the circular end profile of the plate. The slots 33 intercept the bore 32 and perforate the inner face 19 so as to conduct liquid received in the bore to the chamber 18. As indicated in FIG. 1 the plane of each slot 33 is perpendicular to an imaginary radial line generally drawn between its mid-section and the axis of the circular end plate 11. It can be seen in FIGS. 1 and 3 that the slots are adjacent the inner wall of the shell 13. The slots 33, at their intersection with the surface 19 are substantially greater in length, with reference to the flow direction, than in width.

The outlet passage or discharge port 29 is formed by a straight cylindrical bore 34 extending along a line radial to the center of the circular end plate 11 and parallel to the inner surface 19. A central circular recess 35 provides communication between the cylindrical bore 34 and the interior of the anode tube 14. The recess 35 has a stepped diameter with its major diameter sized to closely fit the outside diameter of the anode tube 14. A radial shoulder 36 of the stepped bore recess 35 is adapted to abut an upper end face 37 of the anode tube 14. A hole 38 parallel but slightly offset from the axis of the end plate 11 receives a stud 39 welded or otherwise affixed to the upper end of the anode tube 14.

The lower end plate 12 has a central circular recess 41 dimensioned to fit the outside diameter of the anode tube 14. At the outer face of this lower end plate 12 is a counterbore 42 which connects with the recess 41. A provisional vent and drain hole 43 through the lower end plate 12 is provided with pipe threads and receives a conventional male pipe plug 44. The shell 13 is formed of stainless steel or other material which is chemically resistant to the solution processed in the chamber 18 and which is electrically conductive. The shell 13 may, for example, be formed from a rectangular flat sheet rolled into a cylinder or from seamless or seamed tubing stock. A threaded stud 46 is welded or otherwise fixed to the side of the shell 13 and serves as an electrical terminal which is connected by a wire (not shown) to the power supply 15.

The central electrode 14 forms the anode for the electrolytic process. The electrode 14, preferably, is fabricated from stainless steel stock or other suitable chemically resistant, electrically conductive material. As shown, the anode tube 14 is formed as a weldment of a cylindrical tube 48, an apertured disc 49, the terminal stud 39, and a plug 51. The stud or terminal 39 is in parallel alignment with the tube 48 and is threaded at its upper end 53 to receive a nut 52. The upper threaded end 53 of the stud 39 is electrically connected to the power supply by a suitable wire (not shown). The plug 51, permanently fixed in the lower end of the tube 48, has a central threaded hole in which is received a socket head cap screw 56 assembled through the end plate bore 42. The disc 49 is located adjacent the lower end of the tube 48 and the inner face 20 of the end plate 12. Adjacent and above the disc 49 are a plurality of intake holes 58 formed through the wall of the tube 48 and representing the beginning of the outlet flow circuit. The length of the tube 48 is determined such that when the nut 52 is tightened against the upper face of the upper end plate 11 and the screw 56 is tightened against the radial shoulder of the counterbore 42, the ends, designated 61, 62 of the shell 13 are adequately tightened against the gaskets 26 to ensure fluid-tight contact in these zones. O-rings or like means may be disposed in the end plate holes 38, 42 in a known manner to eliminate leakage of liquid from the chamber 18.

The power supply 15, which is of a generally conventional design, is arranged to be connected by a standard power cord 63 to an electric utility service, normally 115 volts AC. The power supply 15 converts this utility service to a low voltage direct current suitable for promoting electrolytic action in the chamber 18 and applies such voltage across the anode 14 and cathode 13 through their respective terminals 39, 46. The power supply 15 is screwed or otherwise suitably attached to the upper end plate 11. The cup-shaped cover or cap 16 is removably secured to the upper end plate 11 as by a friction fit.

A liquid, such as previously used photographic or radiographic solution carrying silver ions, is circulated through the device 10. This circulation can be accomplished by a remote pump or other means capable of maintaining a pressure in the inlet 28 above that in the outlet 29. Liquid entering the inlet bore 32 is discharged at a relatively high velocity out of the inlet nozzles or slots 33. The concentric or tangentional orientation of the nozzles 33 induces a vortex flow of such liquid in the chamber 18 as indicated by the arrows 66 in FIG. 3. This vortex flow improves the efficiency of the device 10 in collecting metal ions on the interior wall of the cathode shell 13. The plate or disc 49, which extends in a plane parallel to and spaced from the inner surface 20 of the lower end plate 12 is believed to increase turbulance and collector efficiency in the associated end of the collection chamber 18. Fluid, having moved in a helical path from the upper end of the chamber 18 the lower end flows radially inward, enters the intake holes 58 in the anode tube 48, flows axially upward through the tube, reaches the outlet bore 34 and is discharged from the outlet port 29.

When a sufficient amount of metal has been collected on the interior of the shell 13, the shell can be removed from the other elements of the device 10. This removal is simply accomplished by the user by removing the cap screw 56 and separating the shell 13 from the end plates 11, 12. Because of its simplicity and minimal fabrication requirements, the shell 13 can be treated as a disposable item to be sent off with the reclaimed metal to a metal recycler. For reuse of the device, a new shell 13 is assembled with the other described elements.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. Apparatus for collecting ionized metal from a liquid solution comprising a fluidtight housing, the housing including a cylindrical shell and opposed end walls enclosing a cylindrical collection chamber, at least one end wall removeable from said shell and closing one end of the chamber, means forming a cathode at the interior wall of the shell chamber, an anode in the chamber extending generally along its axis, terminal means associated with each of the cathode and anode for establishing electrical current therebetween through the liquid in the chamber, an inlet for admitting fluid into the chamber adjacent one of its ends including nozzles, the anode being hollow for a major portion of its length, said anode including intake means adjacent one of its ends adjacent an end of the chamber opposite said one end, said anode including means for releasably securing said releasable end wall in assembled relation to said shell, said inlet including a bore in the associated end wall in a plane generally transverse to the axis of the chamber, a plurality of slots each extending through an inner face of the associated end wall and communicating with said bore, said slots each being elongated in a direction tangent to a circle concentric with the axis of the chamber whereby solution discharged into said chamber through said inlet slots is induced to flow in spiral currents towards said anode intake means.

2. Apparatus as set forth in claim 1 wherein said anode is arranged to compress both of said end walls against their respective shell ends to maintain a fluid-tight assembly therebetween.

3. Apparatus as set forth in claim 1 wherein said device includes a power supply mounted on one of said end walls.

4. Apparatus as set forth in claim 1 wherein said inlet and power supply are associated with a common end wall.

5. A device for collecting ionized metal from a liquid solution comprising a fluidtight housing including a cylindrical chamber, means forming a cathode for receiving metal deposits adjacent the circumference of the chamber, an anode in the chamber adjacent its axis, an end plate at each end of the cylindrical chamber, liquid inlet means for supplying liquid to the chamber, liquid outlet means for conducting liquid from the chamber, said liquid inlet means including a manifold formed in one of said end plates, said manifold including a plurality of nozzles for discharging liquid directly into said chamber, said nozzles each being formed by a slot extending through an inner face of the associated end plate, each of said slots having a length substantially greater than its width, each of said slots extending along a line tangent to a circle concentric with the axis of said chamber, said outlet means including intake means adjacent an end of said chamber opposite said one end plate, the orientation of said nozzles and their axial displacement from said outlet intake means being such as to induce a vortex flow of liquid through the chamber and thereby improve the efficiency of the device.

6. A device as set forth in claim 5 wherein said manifold includes a cylindrical bore extending along a line which is chordal to said cylindrical chamber.

7. A device as set forth in claim 5 wherein said nozzles are in respective planes oblique to said chordal line.

8. A device as set forth in claim 5 wherein said nozzles are adjacent the circumference of said cylindrical chamber.

* * * * *